United States Patent [19]

Saxton et al.

[11] Patent Number: 5,554,356
[45] Date of Patent: Sep. 10, 1996

[54] METHOD OF MAKING ESSENTIALLY SILICIC ZEOLITE BETA

[75] Inventors: Robert J. Saxton, West Chester; John G. Zajacek, Devon, both of Pa.

[73] Assignee: ARCO Chemical Technology, L.P., Greenville, Del.

[21] Appl. No.: 473,394

[22] Filed: Jun. 7, 1995

[51] Int. Cl.⁶ .................................... C01B 37/02
[52] U.S. Cl. ................ 423/706; 423/708; 423/DIG. 27
[58] Field of Search .................... 423/701, 706, 423/708, DIG. 27

[56] References Cited

U.S. PATENT DOCUMENTS

| | | | |
|---|---|---|---|
| 3,308,069 | 3/1967 | Wadlinger et al. | 502/62 |
| 4,061,724 | 12/1977 | Grose et al. | 423/705 |
| 4,508,837 | 4/1985 | Zones | 502/62 |
| 4,539,193 | 9/1985 | Valyosik | 423/708 |
| 4,554,145 | 11/1985 | Rubin | 423/708 |
| 4,642,226 | 2/1987 | Calvert et al. | 423/706 |
| 4,847,055 | 7/1989 | Chu | 423/705 |
| 4,910,006 | 3/1990 | Zones et al. | 423/706 |
| 4,923,690 | 5/1990 | Valyocsik et al. | 423/705 |
| 5,106,801 | 4/1992 | Zones et al. | 502/64 |
| 5,164,169 | 11/1992 | Rubin | 423/709 |
| 5,200,168 | 4/1993 | Apelian et al. | 423/DIG. 27 |
| 5,310,534 | 5/1994 | Fajula et al. | 423/715 |
| 5,374,747 | 12/1994 | Saxton et al. | 549/531 |
| 5,453,511 | 9/1995 | Saxton | 423/706 |

FOREIGN PATENT DOCUMENTS

| | | |
|---|---|---|
| 2037596 | 7/1991 | Spain . |
| WO9408898 | 4/1994 | WIPO . |

OTHER PUBLICATIONS

Van Der Waal et al. *J. Chem. Soc. Chem. Commun:* 1241–1242 (1994) (no month).
Goepper et al., *J. Chem. Soc. Chem. Commun*, 1665–1666 (1992).
Tu et al., *Zeolites*, 14, 594–599 (1994) Sep./Oct.
Moini et al., *Zeolites*, 14, 504–511 (1994) Sep./Oct.
Perrez–Pariente et al., *Zeolites*, 8, 46–53 (1988) Jan.

*Primary Examiner*—Mark L. Bell
*Assistant Examiner*—David Sample
*Attorney, Agent, or Firm*—Stephen D. Harper

[57] ABSTRACT

A molecular sieve having a zeolite beta morphology, but essentially free of alumina, is prepared from a silicon oxide source in high yield by a hydrothermal crystallization in the presence of a diquaternary templating agent. The templating agent may be derived from a diamine such as 4,4'-trimethylenebis(N-benzylpiperidine).

20 Claims, No Drawings

METHOD OF MAKING ESSENTIALLY SILICIC ZEOLITE BETA

FIELD OF THE INVENTION

This invention relates to methods for synthesizing zeolite beta having essentially only silica in its framework structure. A diquaternary ammonium compound is utilized as a templating agent in such synthesis.

BACKGROUND OF THE INVENTION

Zeolite beta, which is the only high-silica zeolite with a three dimensional pore system containing large 12-membered ring apertures, is a molecular sieve known to have useful catalytic properties. Synthetic methods for preparing such materials in most instances yield zeolite beta containing both silica and alumina in the lattice framework of the zeolite. In U.S. Pat. No. 3,308,069 (Wadlinger et al.), for example, zeolite betas having silica:alumina molar ratios of from 5 to 200 are described. One group of workers observed in 1988 that "[i]t is very difficult to effectively synthesize siliceous crystals of zeolite beta" [Perez-Pariente et al., Zeolites, 8, 46–53 (1988)]. More recently, procedures for obtaining all-silica zeolite beta have been disclosed. An essentially silicic beta zeolite having a silica/alumina ratio of greater than or equal to about 800 and a crystallinity of greater than or equal to about 80% was claimed in U.S. Pat. No. 5,310,534 (Fajula et al.) to have been prepared by a dealuminization procedure comprising acid leaching of a raw zeolite containing a structuring agent. Dealuminization can, however, under certain conditions result in the loss of zeolite crystallinity and the creation of framework vacancies or defects; such changes may not always be desirable, depending upon the application contemplated for the zeolite beta product. An all-silica zeolite beta has also been synthesized under hydrothermal conditions using dibenzyldimethylammonium cation as a templating agent [van der Waal, J. Chem. Soc., Chem. Commun. 1241–1242 (1994)]. In our hands, however, this method gives unsatisfactorily low yields of silicic zeolite beta (possibly due to the thermal instability of the particular templating agent used). It would be highly desirable to develop more efficient methods for preparing essentially silicic zeolite beta having a high degree of crystallinity.

SUMMARY OF THE INVENTION

This invention provides a method of preparing an essentially silicic zeolite beta comprising the steps of preparing a reaction mixture comprising a source of silicon oxide, water, and a diquaternary ammonium compound wherein each nitrogen atom bears at least one benzyl group and the nitrogen atoms are linked by an organic moiety such that the nitrogen atoms are separated by at least 7 but no more than 11 atoms, maintaining the reaction mixture at a temperature of at least 100° C. until crystals of an as-synthesized zeolite comprised of the essentially silicic zeolite beta and the templating agent are formed, and recovering said crystals. High yields of zeolite beta are obtained; the crystallinity of the product is, in preferred embodiments, at least 80% and may be greater than 90% or even as high as 100% as determined by traditional x-ray analysis techniques. The silicic zeolite beta is essentially free of defects and framework vacancies. Such favorable results were surprising in view of the difficulties normally associated with the preparation of high silica zeolites having a beta structure.

DETAILED DESCRIPTION OF THE INVENTION

We have found that hydrothermal synthesis of an essentially silicic zeolite beta may only be successfully accomplished using a particular type of templating agent, namely, a diquaternary ammonium compound wherein each nitrogen atom bears at least one benzyl group and the nitrogen atoms are linked by an organic moiety such that the nitrogen atoms are separated by at least 7 (more preferably, at least 8) but no more than 11 atoms (more preferably, no more than 10). The organic moiety preferably is hydrocarbon in character and may contain aliphatic as well as aromatic segments. Preferably, each nitrogen atom is contained within a 5 to 7 membered alicyclic ring, most preferably a piperidinyl group. Each nitrogen preferably bears, in addition to the benzyl group and the organic linking moiety, at least one $C_1$–$C_5$ alkyl group (most preferably, methyl or ethyl). The templating agent is preferably water soluble. In one desirable embodiment, the diquaternary ammonium compound has the formula

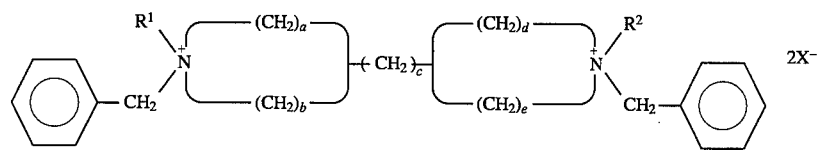

wherein $R^1$ and $R^2$ are the same or different and are methyl or ethyl, a, b, d, and e are the same or different and are each an integer of from 1 to 3, a+b=3–5, d+e=3–5, c=2–4, and X is an anion which is not detrimental to the formation of the essentially silicic zeolite beta.

The preferred templating agents useful in the present process are methylammonium salts of the 4,4'-trimethylenebis (N-benzylpiperidine) family. They have a molecular structure of the general form

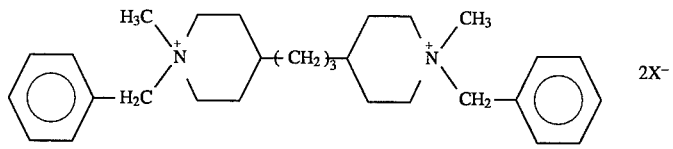

wherein X is an anion which is not detrimental to the formation of the desired essentially silicic zeolite beta. The anion thus may be halide (e.g., F, Cl, Br, I), hydroxide, acetate, sulfate, carboxylate, tetrafluoroborate, or the like, with hydroxide being particularly preferred. If the anion is not hydroxide, it is desirable to utilize an added base or the like as a mineralizing agent to promote the formation of the desired three-dimensional molecular sieve silicate structure containing Si—O—Si bonds from the silicon oxide source. Suitable templating agents may be prepared from readily available diamine starting materials using conventional procedures for the formation of quaternary ammonium compounds. For example, diquaternization of 4,4'-trimethylenebis (N-benzylpiperidine) may be accomplished by reaction with at least two equivalents of a methyl halide. Following purification by recrystallization or the like, if desired, the dihalide salt can be ion-exchanged to the corresponding dihydroxide salt using an appropriate ionexchange resin. The use of the term "templating agent" herein is not intended to be limiting with respect to the mechanism by which the present process operates since, in fact, such mechanism is not well understood.

As used herein, the term "essentially silicic" refers to a zeolite having a very high $SiO_2/Al_2O_3$ molar ratio, preferably a $SiO_2/Al_2O_3$ molar ratio greater than 750 (more preferably, greater than 1000, most preferably, approaching infinity). The process of this invention is capable of producing zeolite beta having no detectable amount of $Al_2O_3$ (i.e., less than 100 ppm Al) wherein the lattice framework of the molecular sieve consists only of silicate.

The templating agent is contacted with a source of silicon oxide in the presence of water to form the essentially silicic zeolite beta. Suitable active sources of silicon oxide are well-known in the zeolite art and include, for example, silicates, silica hydrogel (precipitated silica), fumed silica, silicic acid, colloidal silica, tetraalkylsilicates, silica precursor (as described in U.S. Pat. No. 4,983,275, incorporated herein by reference in its entirety) and silica hydroxides. The use of tetraalkylsilicates such as tetraethyl orthosilicate and the like is especially advantageous.

If so desired, the process of this invention may be practiced using, in addition to the silicon oxide source, sources of other non-aluminum elements having a +4 oxidation state such as titanium, tin and germanium, for example.

When the diquaternary ammonium compound is provided to the reaction mixture in the form of the hydroxide (i.e., when X=OH) in sufficient quantity to establish a suitable degree of basicity (preferably, a pH of from 10 to 14), the reaction mixture need contain only water and the silicon oxide source as additional ingredients. In those cases where the pH is required to be increased to above 10, an alternative source of hydroxide or an equivalent base such as ammonium hydroxide or alkali metal hydroxide can be suitably employed for such purpose.

The present process is suitable for preparing essentially alumina-free zeolite beta, i.e., a product having a silica to alumina molar ratio of infinity. The terms "essentially alumina-free" and "essentially silicic" are used because in practice it is exceedingly difficult to prepare completely aluminum-free reaction mixtures for synthesizing these materials. Especially when commercial silica sources are used, aluminum is nearly always present to a greater or lesser degree. The hydrothermal reaction mixtures from which the essentially silicic zeolite beta may be prepared can be referred to as being substantially alumina free. By this usage is meant that no aluminum is intentionally added to the reaction mixtures, e.g., as an alumina or aluminate reagent, and that to the extent aluminum is present, it occurs only as a contaminant in the other reagents.

In preparing the essentially silicic zeolite beta according to the present invention, the reaction mixture is maintained at an elevated temperature until crystals are formed. When a tetraalkylsilicate is utilized as a source of silicon oxide, it may be beneficial to first remove any alcohol generated as a result of hydrolysis. The temperature during the hydrothermal crystallization step is typically maintained within the range of from 100° C. to 235° C., preferably from about 120° C. to 160° C. The crystallization period is typically greater than 1 day and preferably from 3 to 50 days. Generally speaking, it is most efficient from the standpoint of reagent usage to continue heating the reaction mixture until the yield of crystals is maximized or until such time as additional crystals are being formed at an impracticably slow rate.

The hydrothermal crystallization is usually conducted under pressure and usually in an autoclave or other suitable reactor vessel so that the reaction mixture is subject to autogenous pressure. The reaction mixture can be stirred or otherwise agitated during crystallization or can remain static.

During the hydrothermal crystallization step, the crystals can be allowed to nucleate spontaneously from the reaction mixture. The reaction mixture can also be seeded with crystals both to initiate and accelerate the crystallization, as well as to minimize the formation of any undesired crystalline phases. When seed crystals are employed, a quantity of seed crystals equal to from 0.1% to 10% of the weight of the silicon oxide source is typically added.

The relative amounts of the components present in the reaction mixture preferably are adjusted such that the mixture has a composition in terms of molar ratio, within the ranges recited in the following Table A:

TABLE A

|  | Broad | Preferred |
|---|---|---|
| $SiO_2/Al_2O_3$ | >750 | >1000 |
| $DQ/SiO_2$ | 0.1–10 | 0.5–2.0 |
| $OH/SiO_2$ | 0.05–20 | 1–4 |
| $H_2O/SiO_2$ | 5–200 | 10–100 | wherein DQ is the diquaternary templating agent. The OH (hydroxide) can be substituted in whole or in part by another suitable mineralizing agent.

Each component utilized in the reaction mixture can be supplied by one or more individual materials and they can be combined or mixed together in any order. The reaction mixture can be prepared either batchwise or continuously. The template may be introduced by means of wetness impregnation techniques wherein a silicon oxide source in solid form (including gelatinous precipitates and gels) is impregnated with a quantity of an aqueous solution of the template effective to fill the pore volume of the silicon oxide source. The impregnated silicon oxide source is thereafter subjected to hydrothermal crystallization. Solution hydrothermal procedures, as are hereinafter described by way of example, may also be advantageously employed.

Once the crystals have formed, the solid as-synthesized zeolite is separated from the reaction mixture by standard mechanical separation techniques such as filtration, decantation, or centrifugation. The crystals may be washed with a suitable solvent such as water and then dried at moderate temperatures (e.g., 90° C. to 150° C.) for 8 to 24 hours to obtain the as-synthesized zeolite crystals. The drying step can be performed at atmospheric or subatmospheric pressures.

The exact structural nature of the as-synthesized zeolite crystals is not known. The silicic zeolite beta exhibits minimal ion exchange properties and since no $AlO_4^-$ tetrahedra are present as essential framework constituents, the templating agent is apparently not required for the purpose of providing cations, such as are found in aluminosilicate zeolites, to balance the negative electrovalence thereof. It can be theorized, however, that the principal function of the diquaternary ammonium compound is to provide a template-like material which assists in the arrangement of $SiO_4$ tetrahedra into the zeolite beta lattice form in preference to other forms such as silicalite.

The as-synthesized zeolite crystals comprise the templating agent in combination with silicon oxide (silica) bonded in primarily tetrahedral coordination through shared oxygen atoms to form a cross-linked three dimensional crystal structure having a zeolite beta morphology. The general preferred formula of the as-synthesized zeolite crystals, in the anhydrous state, may be expressed as 0.5 to 2 DQ: $SiO_2$:0 to 0.001 $Al_2O_3$ wherein DQ is the diquaternary templating agent.

The as-synthesized zeolite crystals may be calcined to remove the templating agent if so desired by heating in air or other oxygen-containing gas or an inert gas at a temperature of from 200° C. (more preferably, at least 400° C.) to 900° C. The essentially silicic zeolite beta obtained by the process of this invention has a uniform, essentially defect-free pore structure which imparts size- and shape- selective molecular sieve properties to the composition. The essentially silicic zeolite beta thus is useful for separating molecules of different sizes and shapes. Moreover, the product of this invention has hydrophobic/organophilic characteristics which may be utilized in effectively absorbing organic materials from water or gases. The fact that the silicic zeolite beta lacks any significant degree of ion-exchange capability may be advantageous where the zeolite beta is to be employed as an adsorbent. The silicic zeolite beta may be utilized as a carrier or support for a catalytically active metal such as, for example, a transition metal. For instance, the silicic zeolite beta may be impregnated with a noble metal such as palladium, platinum, ruthenium, rhodium or the like to provide a material useful as a hydrogenation, dehydrogenation, or oxidation catalyst.

In contrast to the synthetic zeolites obtained by the dealumination procedures of U.S. Pat. No. 5,310,534, the molecular sieves synthesized by means of the present process contain essentially no Bronsted acid sites.

It may be desirable to incorporate a zeolite prepared in accordance with the process of this invention into a material resistant to the conditions which may be encountered by the zeolite in a particular end-use application. Such matrix materials include synthetic and naturally occurring substances, such as inorganic materials, e.g., clay, silica and metal oxides. The latter may be either naturally occurring or in the form of gelatinous precipitates or gels, including mixtures of silica and metal oxides. Naturally occurring clays can be composited with the zeolites, including those of the montmorillonite and kaolin families. These clays can be used in the raw state as originally mined or initially subject to calcination, acid treatment or chemical modification to enhance their activity. The relative proportions of zeolite component and inorganic oxide gel matrix on an anhydrous basis may vary widely with the zeolite content ranging from 5 to 80, more usually 10 to 70 wt % of the dry composite. The matrix itself may possess catalytic properties (for example, the matrix may provide acidic sites).

In addition to the foregoing materials, the essentially silicic zeolite beta can be composited with a porous matrix material such as silicia, titania, magnesia, alumina, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components can also be used. The relative proportions of the zeolite beta and inorganic oxide matrix may vary widely with the zeolite beta content ranging from about 1 to 90 percent by weight, usually from about 2 to about 50 percent by weight of the composite.

EXAMPLES

To 30 mL of a 0.30N aqueous solution of 4,4'-trimethylenebis (N-benzyl-N-methyl piperidinium) dihydroxide (designated DQ) was added dropwise over a period of 15 minutes 15 g (0.072 mol) tetraethylorthosilicate while maintaining constant stirring. To the resultant clear solution was then added slowly 63 mL of a 1N aqueous solution of DQ (total of 0.072 mol DQ) and the clear solution then stirred an additional 3 hours at room temperature. The alcohol produced during hydrolysis was removed by gently sparging nitrogen through the solution while heating at 60° C. for 1 hour. The final clear aqueous solution, which had a pH of 11.5, was loaded into Teflon-lined Parr reactors, aged overnight while covered, and then heated at 135° C. for 12 days under static conditions. The colorless crystalline product was recovered by filtration, washed well with water, and then dried at 120° C.

Powder XRD analysis of the as-synthesized material exhibited a spectrum characteristic of zeolite beta. Thermal analysis (to a temperature of 700° C.) indicated a 40% decrease in weight attributable to loss of the templating agent. Elemental analysis of the calcined material showed the presence of 40 weight % Si and <100 ppm Al, confirming that an essentially silicic zeolite beta had been obtained. Vapor phase adsorption of different probe molecules over the calcined material at $P/P_o$=0.5 (25° C.) indicated that the essentially silicic zeolite beta has an effective void volume similar to that reported in the literature for H-beta zeolite (containing alumina):

| Sample | Void Volume (mL/g) | |
| --- | --- | --- |
|  | n-Hexane | m-Xylene |
| silicic zeolite beta (this invention) | 0.270 | 0.260 |
| H-zeolite beta[1] | 0.29 | 0.29 |

[1]Szostak, Handbook of Molecular Sieves, Van Nostrand Reinhold, New York, 1992, p. 97.

We claim:

1. A method of preparing an essentially silicic zeolite beta comprising:

(a) preparing a reaction mixture comprising a source of silicon oxide, water, and a diquaternary ammonium compound wherein each nitrogen atom bears at least one benzyl group and the nitrogen atoms are linked by an organic moiety such that the nitrogen atoms are separated by at least 7 but no more than 11 atoms;

(b) maintaining the reaction mixture at a temperature of at least 100° C. until crystals of an as-synthesized zeolite comprised of the essentially silicic zeolite beta and the diquaternary ammonium compound are formed; and (c) recovering said crystals.

2. The method of claim 1 wherein the source of silicon oxide is selected from the group consisting of silicates, silica hydrogel, silicic acid, colloidal silica, tetraalkyl orthosilicates, silica precursor, and silica hydroxides.

3. The method of claim 1 wherein the reaction mixture has a composition in terms of mole ratios falling in the range $DQ:SiO_2=0.1:1$ to $10:1$ wherein DQ is the diquaternary ammonium compound.

4. The method of claim 1 comprising the additional step after step (c) of washing the recovered crystals with water.

5. The method of claim 1 wherein the diquaternary ammonium compound contains hydroxide as an anion.

6. The method of claim 1 comprising the additional step after step (c) of calcining the recovered crystals.

7. The method of claim 1 wherein each nitrogen atom in the diquaternary ammonium compound is contained within a 5 to 7 membered alicyclic ring.

8. The method of claim 1 wherein each nitrogen atom bears, in addition to the benzyl group and the organic moiety, a $C_1$–$C_5$ alkyl group.

9. The method of claim 1 wherein the nitrogen atoms are linked by an organic moiety such that the nitrogen atoms are separated by at least 8 but no more than 10 atoms.

10. The method of claim 1 wherein each nitrogen atom in the diquaternary ammonium compound is contained within a 5 to 7 membered alicyclic ring and bears, in addition to the benzyl group and the organic moiety, a $C_1$–$C_5$ alkyl group, and the nitrogen atoms are separated by at least 8 but no more than 10 atoms.

11. A method of preparing an essentially silicic zeolite beta comprising preparing a reaction mixture comprising a source of silicon oxide, water, and a diquaternary ammonium compound wherein each nitrogen atom bears a benzyl group and a $C_1$–$C_5$ alkyl group and is contained within a 5 to 7 membered alicyclic ring and the nitrogen atoms are separated by at least 8 but no more than 10 atoms, said reaction mixture having a composition, in terms of mole ratios, within the following ranges:

| | |
|---|---|
| $SiO_2/Al_2O_3$ | >1000 |
| $DQ/SiO_2$ | 0.5–2.0 |
| $OH/SiO_2$ | 1–4 |
| $H_2O/SiO_2$ | 10–100 | wherein DQ is the diquaternary ammonium compound, maintaining the reaction mixture at a temperature of 120° C. to 160° C. until crystals of an as-synthesized zeolite comprised of the essentially silicic zeolite beta and the diquaternary ammonium compound are formed, and recovering said crystals.

12. The method of claim 11 wherein the source of silicon oxide is a tetraalkylsilicate.

13. The method of claim 11 wherein the diquaternary ammonium compound has the formula

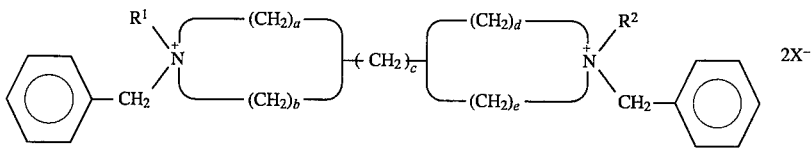

wherein $R^1$ and $R^2$ are the same or different and are methyl or ethyl, a, b, d, and e are the same or different and are each an integer of from 1 to 3, a+b=3–5, d+e=3–5, c=2–4, and X is an anion which is not detrimental to the formation of the essentially silicic zeolite beta.

14. The method of claim 13 wherein $R^1$ and $R^2$ are methyl, a, b, d, and e are 2, and c is 3.

15. The method of claim 13 wherein X is hydroxide.

16. An as-synthesized zeolite comprising an essentially silicic zeolite beta and a diquaternary ammonium compound wherein each nitrogen atom bears at least one benzyl group and the nitrogen atoms are linked by an organic moiety such that the nitrogen atoms are separated by at least 7 but no more than 11 atoms.

17. The as-synthesized zeolite of claim 16 wherein each nitrogen atom in the diquaternary ammonium compound is contained within a 5 to 7 membered alicyclic ring.

18. The as-synthesized zeolite of claim 16 wherein each nitrogen atom bears, in addition to the benzyl group, a $C_1$–$C_5$ alkyl group.

19. The as-synthesized zeolite of claim 16 wherein the molar ratio of essentially silicic zeolite beta to diquaternary ammonium compound is from 1:0.5 to 1:2.

20. An as-synthesized zeolite comprising an essentially silicic zeolite beta and a diquaternary ammonium compound of formula

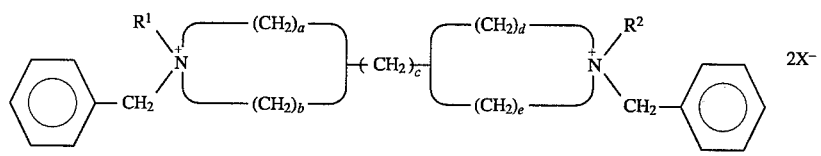
wherein $R^1$ and $R^2$ are the same or different and are methyl or ethyl, a, b, d, and e are the same or different and are each an integer of from 1 to 3, $a+b=3-5$, $d+e=3-5$, $c=2-4$, and X is an anion which is not detrimental to the formation of the essentially silicic zeolite beta.
* * * * *